(12) United States Patent
Dang et al.

(10) Patent No.: US 9,507,427 B2
(45) Date of Patent: Nov. 29, 2016

(54) TECHNIQUES FOR GESTURE RECOGNITION

(75) Inventors: Xiaoyan Dang, Beijing (CN); Mingzhi Dong, Beijing (CN); Wei Wang, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 7 days.

(21) Appl. No.: 13/976,936

(22) PCT Filed: Jun. 29, 2011

(86) PCT No.: PCT/CN2011/001068
§ 371 (c)(1),
(2), (4) Date: Mar. 21, 2014

(87) PCT Pub. No.: WO2013/000099
PCT Pub. Date: Jan. 3, 2013

(65) Prior Publication Data
US 2014/0198029 A1    Jul. 17, 2014

(51) Int. Cl.
*G06F 3/01*       (2006.01)
*G06F 3/0346*    (2013.01)
*G06K 9/00*      (2006.01)

(52) U.S. Cl.
CPC ............. *G06F 3/017* (2013.01); *G06F 3/0346* (2013.01); *G06K 9/00335* (2013.01)

(58) Field of Classification Search
CPC ............... G06F 3/017; G06F 3/0487–3/04897
USPC ................................... 345/156–184; 715/863
See application file for complete search history.

(56) References Cited

U.S. PATENT DOCUMENTS

| | | | |
|---|---|---|---|
| 8,570,289 B2* | 10/2013 | Chang et al. | 345/173 |
| 2010/0204953 A1* | 8/2010 | Onishi et al. | 702/150 |
| 2010/0235786 A1 | 9/2010 | Maizels et al. | |
| 2011/0221974 A1* | 9/2011 | Stern et al. | 348/734 |

FOREIGN PATENT DOCUMENTS

| | | |
|---|---|---|
| CN | 101807113 A | 8/2010 |
| CN | 101976330 A | 2/2011 |

OTHER PUBLICATIONS

International Search Report and Written Opinion, Mailed Date: Mar. 29, 2012, Application No. PCT/CN2011/001068, Filed Date: Jun. 29, 2011, pp. 9.

\* cited by examiner

*Primary Examiner* — Stephen Sherman

(57) ABSTRACT

A method and system may provide gesture recognition techniques. An energy aggregation value may be determined for data corresponding to a gesture using principal component analysis. Based at least in part on the energy aggregation value, it may be determined whether the gesture is a one or two dimensional gesture.

30 Claims, 10 Drawing Sheets

TECHNIQUES FOR GESTURE RECOGNITION

BACKGROUND

Devices such as smart phones, remotes and consoles, and personal digital assistants typically use sensors to detect motion. Sensors may be used in motion-sensitive or motion-based applications. Applications, such as games, often use sensors to allow a user to gesture with the device. For example, a user may swing a remote, such as a Wii remote, as if they were swinging a baseball bat when playing a baseball game on the Wii entertainment system. In other applications, sensors are used to accomplish a task. For example, moving an iphone from right to left may be the equivalent of pressing a previous button or moving the iphone up and down may be the equivalent of scrolling up and down on as webpage.

Devices typically recognize gestures through the use of pattern recognition theory and machine learning methods. Typical gesture recognition techniques include dynamic time wraping, the hidden markov model and/or a support vector machine. These techniques rely on data sets that are generated by user training. Because of the different ways a user may move with a gesture device, a user must typically train a device so that the device can recognize a particular user's gesture with an acceptable level of accuracy. For example, one user may gesture slowly while another user may gesture quickly. While some gesture recognition techniques require online training with a user training the device prior to use, other techniques require large databases for offline training. As a result, the current techniques of gesture recognition are time consuming and/or user dependent. It is with respect to these and other limitations that the present improvements are needed.

DETAILED DESCRIPTION

Embodiments are generally directed to techniques for gesture recognition on a device. As using gesture recognition becomes more commonplace, a gesture recognition technique is needed which accurately recognizes gestures, uses low power, has high accuracy, is user-independent and is training-free.

In an embodiment, for example, an energy aggregation value may be determined for data corresponding to a gesture using principal component analysis. It may be determined whether the gesture is a one or two dimensional gesture based at least in part on the energy aggregation value. In an embodiment, a multi-level decision tree may determine a type of gesture. In an embodiment, a zero crossing rate of the gesture may be compared to a threshold to determine whether a one dimensional gesture is in one or two directions. In an embodiment, energy dispersion may be measured to determine a type of two dimensional gesture.

A high accuracy, low cost, user independent technique to determine a gesture is described. A user may gesture fast or slow, long or short, etc. The technique determines the user's gesture accurately 92% of the time. As the technique is user independent, there is no need for the user to train the device offline or online. Being user independent saves time, cost and removes boundaries to first time use. This technique is cost efficient due to its use of a decision tree and physical properties of the data to determine a type of gesture without the use of complex algorithms.

Other embodiments may be described and claimed. Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
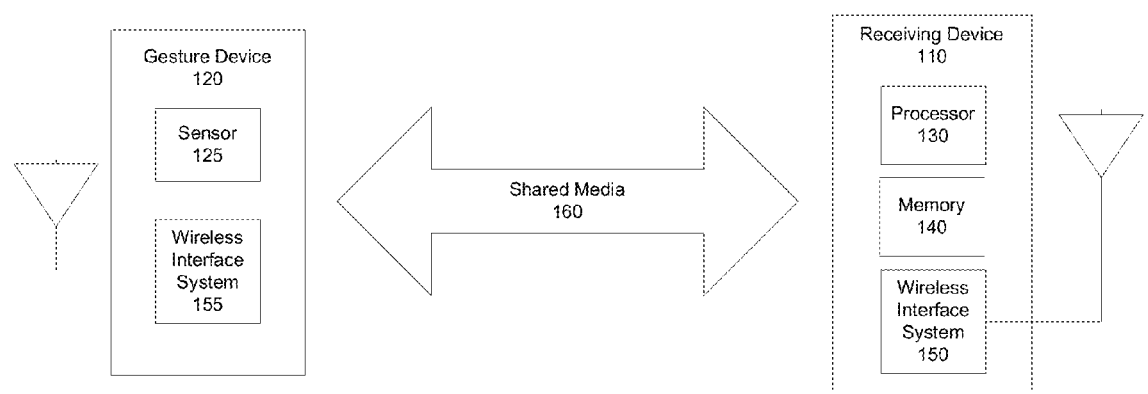
FIG. 1 illustrates one embodiment of a mobile system.

FIG. 1 illustrates a block diagram of one embodiment of a mobile system 100. In various embodiments, the mobile system 100 may comprise multiple nodes. A node generally may comprise any physical or logical entity for communicating information in the mobile system 100 and may be implemented as hardware, software, or any combination thereof, as desired for a given set of design parameters or performance constraints. An example of a node may comprise an electronic device, such as a gesture device or a receiving device. Another example of a node may comprise a part or component of an electronic device, such as a wireless transceiver. Although FIG. 1 may show a limited number of nodes by way of example, it can be appreciated that more or less nodes may be employed for a given implementation.

In various embodiments, the mobile system 100 may comprise, or form part of a wired communications system, a wireless communications system, or a combination of both. For example, the mobile system 100 may include one or more nodes arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The mobile system 100 also may include one or more nodes arranged to communicate information over one or more types of wireless communication links, such as shared media 160. Examples of a wireless communication link may include, without limitation, a radio channel, infrared channel, radio-frequency (RF) channel, a High-Definition Multimedia Interface (HDMI) channel, a digital visual interface (DMI) channel, a video graphics array (VGA) channel, a Wireless Fidelity (WiFi) channel, a Wireless Display (WiDi) channel, a portion of the RF spectrum, and/or one or more licensed or license-free frequency bands. In the latter case, the wireless nodes may include one or more wireless interface systems and/or components for wireless communication, such as one or more radios, transmitters, receivers, transceivers, chipsets, amplifiers, filters, control logic, network interface cards (NICs), antennas, antenna arrays, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth. In an embodiment, certain devices may include antenna arrays of multiple antennas to implement various adaptive antenna techniques and spatial diversity techniques.

In various embodiments, the mobile system 100 may comprise or be implemented as a mobile broadband communications system. Examples of mobile broadband communications systems include, without limitation, systems compliant with various Institute of Electrical and Electronics Engineers (IEEE) standards, such as the IEEE 802.11 standards for Wireless Local Area Networks (WLANs) and variants, the IEEE 802.16 standards for Wireless Metropolitan Area Networks (WMANs) and variants, and the IEEE 802.20 or Mobile Broadband Wireless Access (MBWA) standards and variants, among others. In an embodiment, for example, the communications system 100 may be implemented in accordance with the Worldwide Interoperability for Microwave Access (WiMAX) or WiMAX II standard. WiMAX is a wireless broadband technology based on the IEEE 802.16 standard of which IEEE 802.16-2004 and the 802.16e amendment (802.16e Cor2/D3-2005) are Physical (PHY) layer specifications. WiMAX II is an advanced Fourth Generation (4G) system based on the IEEE 802.16m and IEEE 802.16j proposed standards for International Mobile Telecommunications (IMT) Advanced 4G series of standards.

In various embodiments, the mobile system 100 may comprise a gesture device 120 and a receiving device 110. In an embodiment, the gesture device 120 may be a mobile device. In an embodiment, the receiving device 110 may be incorporated within and/or part of the gesture device 120. In an embodiment, the receiving device 110 may be a physically separate device and may be a mobile and/or non-mobile device.

For example, the gesture device 120 may be a controller, such as, but not limited to, a remote. For example, the receiving device 110 may be a console. Alternatively, the gesture device 120 may be incorporated into the receiving device 110 such as in a mobile phone, a smart phone, a laptop, a notebook, a handheld computer, a handheld enclosure, a portable electronic device, a mobile internet device (MID), a tablet, a computing device with a touch screen, a slate and/or a personal digital assistant. The embodiments, however, are not limited to these examples.

As illustrated in FIG. 1, the gesture device 120 may include a sensor 125 and a wireless interface system 155. In various embodiments, the gesture device 110 may comprise a sensor 125. In an embodiment, the sensor 125 may measure acceleration. In an embodiment, the sensor 125 may be an accelerometer. The sensor 125 may receive data input as a result of the acceleration of a gesture. The gesture may be made by a user. Examples of gestures include both one-dimensional and two-dimensional gestures. Examples of one-dimensional gesture include, but are not limited to, left, right, up, down, left to right, right to left, up to down and down to up. Examples of two-dimensional gestures include, but are not limited to, a circle and a square. The embodiments are not limited in this context.

The wireless interface system 155 may allow the gesture device 120 to communicate in the mobile system 100 with the receiving device 110. In an embodiment, the gesture device 120 may include wireless capabilities.

In various embodiments, the mobile system 100 may comprise a receiving device 110. As illustrated in FIG. 1, the receiving device 110 may include a processor 130, a memory unit 140, and a wireless interface system 150. The embodiments, however, are not limited to the elements shown in FIG. 1.

As shown by the receiving device 110, the receiving device 110 may comprise a processor 130. The processor 130 may be implemented as any processor, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processor 130 may be implemented as a general purpose processor, such as a processor made by Intel® Corporation, Santa Clara, Calif. The processor 130 may be implemented as a dedicated processor, such as a controller, microcontroller, embedded processor, a digital signal processor (DSP), a network processor, a media processor, an input/output (I/O) processor, and so forth. The embodiments are not limited in this context.

As further shown by the receiving device 110, the receiving device 110 may comprise a memory unit 140. The memory unit 140 may comprise any machine-readable or computer-readable media capable of storing data, including both volatile and non-volatile memory. For example, the memory unit 140 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of the memory unit 140 may be included on the same integrated circuit as the processor 130, or alternatively some portion or all of the memory unit 140 may be disposed on an integrated circuit or other medium, for example a hard disk drive, that is external to the integrated circuit of the processor 130. In an embodiment, the memory unit 140 may include data and instructions to operate the processor. The embodiments are not limited in this context.

In various embodiments, the receiving device 110 may communicate information over shared media 160 via respective wireless interface systems 150, 155. The shared media 160 may comprise one or more allocations of RF spectrum. The allocations of RF spectrum may be contiguous or non-contiguous. In some embodiments, the wireless interface systems 150, 155 may communicate information over the shared media 160 using various multicarrier techniques utilized by, for example, WiFi, general packet radio service (GPRS), long term evolution (LTE) technologies, WiMAX and/or WiMAX II systems. In general operation, the wireless interface system 150, 155 may communicate information using one or more communications channels. A communication channel may be a defined set of frequencies, time slots, codes, or combinations thereof.

The receiving device 110 may connect to the gesture device 120 over the shared media 160. One or more logical or physical channels may be established to communicate information. The information may include media information and control information. Media information may refer to any data representing content meant for a user. Examples of content may include, for example, data from a voice conversation, videoconference, streaming video, electronic mail ("e-mail") message, voice mail message ("voice message"), alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner.

Figure 2:
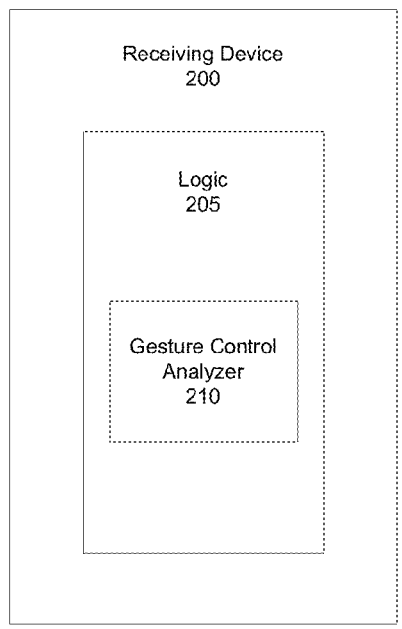
FIG. 2 illustrates a system within the receiving device.

FIG. 2 illustrates a system within the receiving device 200. In an embodiment, a receiving device 200 may include a logic device 205. The logic device 205 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In an embodiment, the logic device 205 may include a gesture control analyzer 210. The gesture control analyzer 210 may be operative to determine an energy aggregation value for data corresponding to a gesture using principal component analysis. In an embodiment, the gesture control analyzer 210 may determine whether the gesture is a one or two dimensional gesture based at least in part on the energy aggregation value. The gesture control analyzer 210 may determine and/or clarify the gesture using a multilevel decision tree. In an embodiment, the multilevel decision tree may use the physical properties of the data in order to determine the type of gesture.

Figure 3:
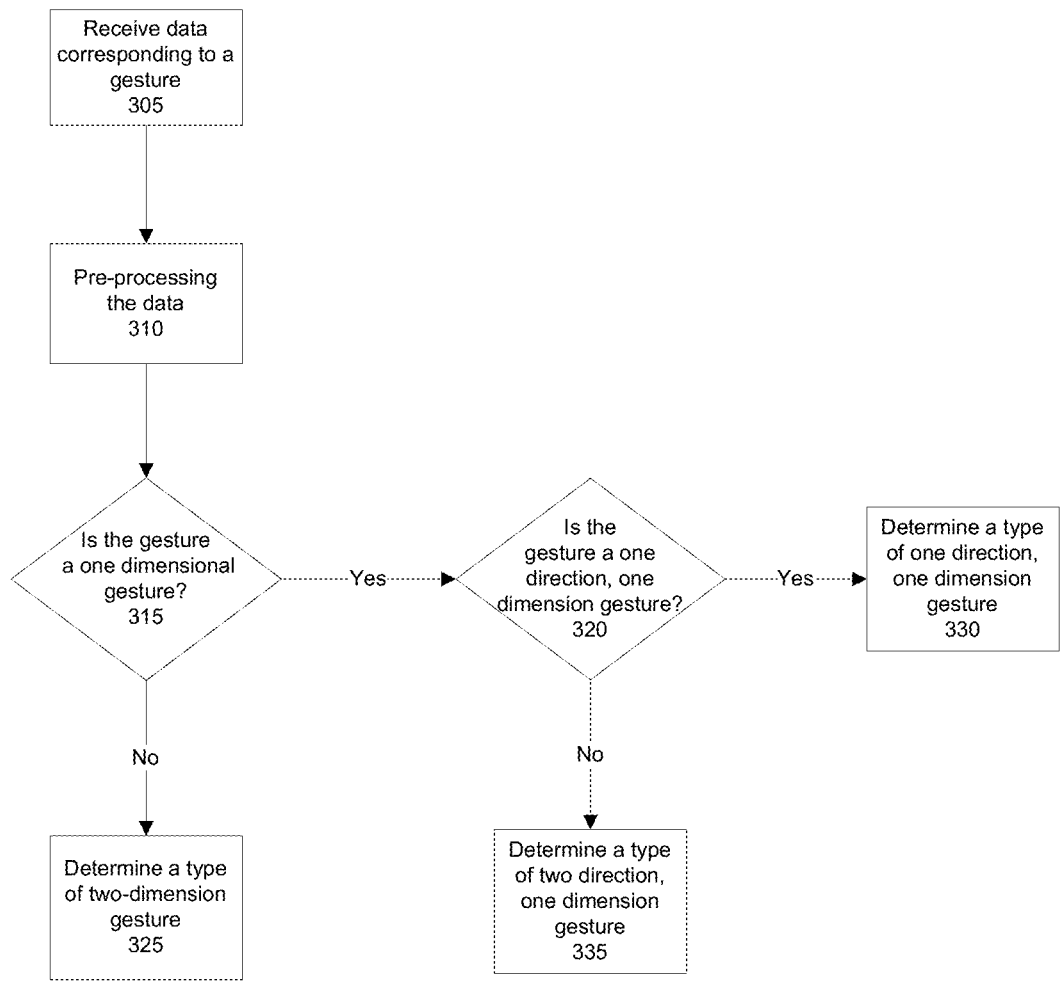
FIG. 3 illustrates a first embodiment of a logic flow.

FIG. 3 illustrates one embodiment of a logic flow 300. Logic flow 300 may be representative of the operations executed by one or more embodiments described herein. It should be noted that the methods described herein do not have to be executed in the order described, or in any particular order. Moreover, various activities described with respect to the methods identified herein can be executed in serial or parallel fashion.

As shown in logic flow 300, the receiving device may receive 305 data corresponding to a gesture from a user. In an embodiment, the data may include one or more data points. In an embodiment, the one or more data points may be a set of data. In an embodiment, a sensor, such as, but not limited to, an accelerometer may receive 305 the data based on the gesture. In an embodiment, the data may be a plurality of data points created by the gesture. In an embodiment, the gesture data may be received based on a three-dimensional axis. For example, the data may be received from a three axis accelerometer and placed on a three dimensional axis (x, y, z). In an embodiment, $\vec{D}$ may represent the received data. $\vec{D} = \{\vec{x}, \vec{y}, \vec{z}\}$ may denote the original gesture data. In an embodiment, $\vec{x}, \vec{y}, \vec{z}$ may be the data in the three different axes of the sensor.

Figure 4:
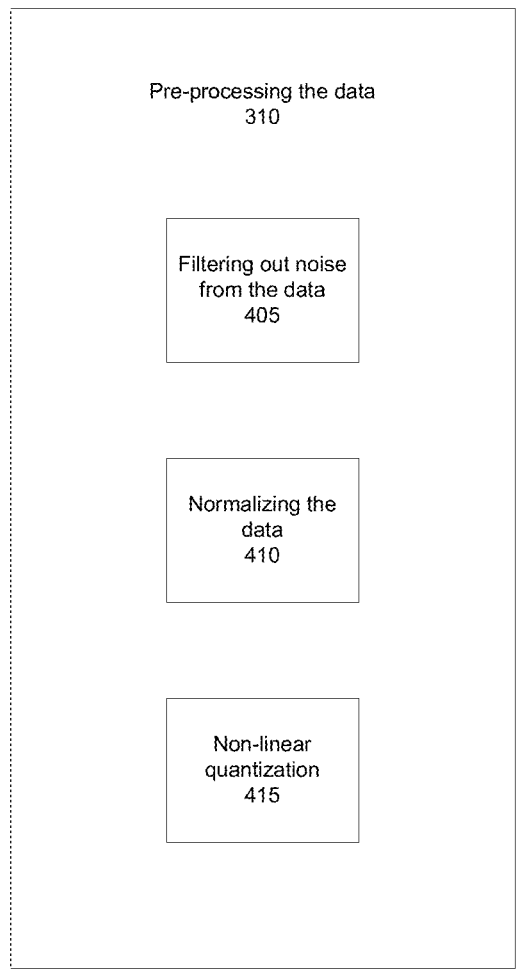
FIG. 4 illustrates an embodiment of a block diagram of pre-processing tasks.

In an embodiment, the data points may be pre-processed 310 to regulate the received data. FIG. 4 illustrates a block diagram of pre-processing techniques. In an embodiment pre-processing may include filtering or scrubbing the data to remove noise 405, normalizing the data 410, using non-linear quantization 415 and/or other techniques to prepare data for processing.

In an embodiment, the received data corresponding to the gesture, $\vec{D}$, may need to be pre-processed as along with other data, such as but not limited to, data based on the gesture, $\vec{D}_h$, gravity data, $\vec{D}_g$, and environmental noise data, $\vec{D}_n$. Accordingly, the data based on the gesture, gravity data and environmental noise data may together create received data, $\vec{D}$ as shown in Equation 1.

$$\vec{D} = \vec{D}_h + \vec{D}_g + \vec{D}_n \quad \text{Equation 1}$$

As the received data corresponding to the gesture, $\vec{D}$ has three axes, the entire gesture vector, $\vec{D}$, may include N samples in the time domain. In an embodiment, the gesture vector, $\vec{D}$, may be described as Equation 2:

$$\vec{D} = \begin{bmatrix} x_1, x_2, \ldots, x_N \\ y_1, y_2, \ldots, y_N \\ z_1, z_2, \ldots, z_N \end{bmatrix}_{3 \times N} \quad \text{Equation 2}$$

In an embodiment, pre-processing may include filtering 405 out any noise from the data. For example, noise may result from a user's hand trembling. For example, noise may result from analog/digital (A/D) loss. By filtering 405 out noise, extraneous data received during the collection of data corresponding to the gesture may be removed. Noise filtering, $\vec{D}_1$, may include removing any noise based on the absolute value of the received data, as shown in Equation 3:

$$\vec{D}_1 = \vec{D}_1 \begin{cases} 0, & \text{if}(\text{abs}(\vec{D}) < 0.5 \text{ abs}(\max(\vec{D})) \\ \vec{D}, & \text{else} \end{cases} \quad \text{Equation 3}$$

The noise filtered data, $\vec{D}_1$, may be set to zero if the absolute value of the received data corresponding to the gesture, $\vec{D}$, is less than 0.5 times the absolute maximum of the received data corresponding to the gesture, $\vec{D}$. Otherwise, the noise filtered data, $\vec{D}_1$, may be set to the received data corresponding to the gesture, $\vec{D}$.

In an embodiment, pre-processing may include normalizing 410 the data. Normalizing may be used to change the range of intensity values. Normalization may be used when a user gestures with the gesture device. Normalization may allow the gesture determination by the gesture control analyzer to be user independent. For example, a first user may make a larger gesture with his or her hand, while a second user may make a smaller gesture with his or her hand. By normalizing the data, the range of data for smaller gestures may be increased and the range of data for larger gestures may be decreased. For example, a first user may make a faster gesture with his or her hand, while a second user may make a slower gesture with his or her hand. By normalizing the data, the range of data for the faster gesture may be spread out and the range of data for the slower gesture may be compressed. In an embodiment, pre-processing may include normalizing 410 the amplitude of $\vec{D}_2$, as shown in Equation 4:

$$\vec{D}_2 = \frac{\vec{D}_1}{\max\{abs((\vec{D})_1)\}} \times 2 \qquad \text{Equation 4}$$

As shown in Equation 4, the filtered data $\vec{D}_1$, may be normalized. The normalized data, $\vec{D}_2$ may be equal to the filtered data divided by the maximum of the absolute value of the filtered data times two.

In an embodiment, non-linear quantization 415 may be performed on the data. Non-linear quantization may map the data $\vec{D}_2$ into a smaller set of data. The data may be reduced by categorizing the data into slots. The filtered, normalized and non-linear quantization of the received data may result in data which has completed being pre-processed, $\vec{D}_p$.

Referring again to FIG. 3, the pre-processed data corresponding to the gesture, $\vec{D}_p$, 310, may determine whether the gesture is a one dimensional gesture or a two dimensional gesture 315. In an embodiment, in order to determine if the gesture is a two dimensional gesture 315, an energy aggregation value may be determined using principal component analysis. Principal component analysis may be used to determine the gesture plane of the data. In an embodiment, in order to determine the gesture, a gesture model may be created. The gesture plane may be determined by looking to the physical properties of the pre-processed data. By determining which direction the energy aggregates, a gesture plane in a gesture model may be created. The gesture plane may be used to determine whether the gesture was a one dimensional gesture or a two dimensional gesture.

Figure 5:
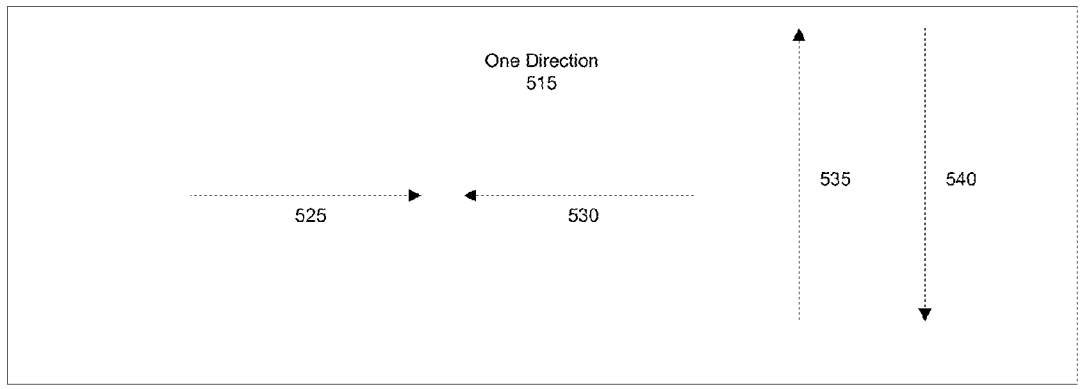
FIG. 5 illustrates an embodiment of exemplary one dimensional gestures.
Figure 5:
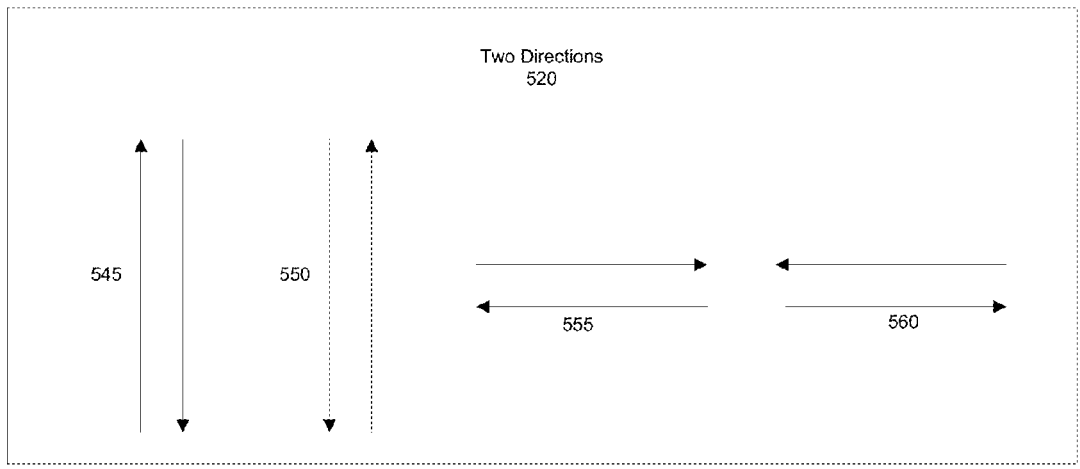
Figure 6:
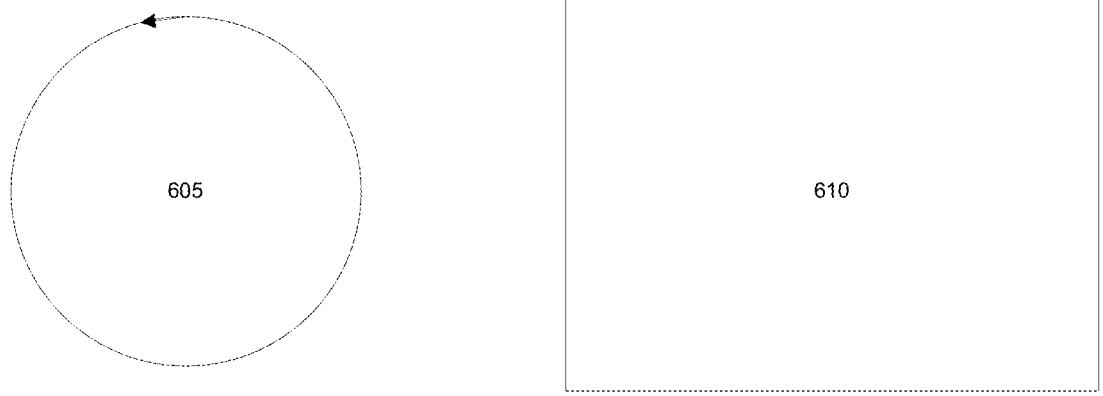
FIG. 6 illustrates an embodiment of exemplary two dimensional gestures.

In an embodiment, gestures may be categorized into one dimensional gestures and two dimensional gestures. FIG. 5 illustrates embodiments of exemplary one dimensional gestures 500. As seen in FIG. 5, one dimensional gestures 500 can be further subcategorized into one direction gestures 515 and two direction gestures 520. Exemplary, one direction gestures include, but are not limited to, right 525, left 530, up 535 and/or down 540. Exemplary, two direction gestures include, but are not limited to, up to down 545, down to up 550, right to left 555, and/or left to right 560. FIG. 6 illustrates an embodiment of exemplary two dimensional gestures 600. Exemplary two dimensional gestures include, but are not limited to, a circle 605 and/or a square 610.

Referring again to FIG. 3, to determine the gesture plane, and thus, whether the gesture is a one dimensional gesture or two dimensional gesture 315, the pre-processed data $\vec{D}_p$ may be determined. An energy aggregation may be determined using the pre-processed data $\vec{D}_p$. In an embodiment, energy aggregation may be determined utilizing traditional principal component analysis (PCA) techniques. An energy aggregation value, A, may be used to determine whether the gesture, $\vec{D}_p$, is a one dimensional gesture or a two dimensional gesture, as shown in Equations 5A-C:

$$A = a_1/a_2 \qquad \text{Equation 5A}$$

where $a_1$ and $a_2$ are the first and second biggest eigenvalues of covariance matrix, $\vec{C}_{3*3}$ $$\vec{C} = (\vec{D}_p - \text{mean}(\vec{D}_p)) \times (\vec{D}_p - \text{mean}(\vec{D}_p))^T \qquad \text{Equation 5B}$$

$$\vec{C} = a_1 \times \vec{v}_1 + a_2 \times \vec{v}_2 + a_3 \times \vec{v}_3 + \ldots a_n \times v_n \qquad \text{Equation 5C}$$

where N is the sample numbers in each gesture, where $a_1 > a_2 > a_3$, and $\vec{v}_1, \vec{v}_2, \vec{v}_3$ are the eigenvectors of covariance matrix, $\vec{C}$.

The energy aggregation value, $A = a_1/a_2$, may determine whether the gesture is a one dimensional gesture or a two dimensional gesture. The energy aggregation value $A(\vec{D}_p)$ may be the amount of time that a gesture is in any one location. In an embodiment, for one dimensional gestures, the energy aggregates in the single largest direction. As a result, one dimensional gestures may have a large change on only a single axis. In an embodiment, for two dimensional gestures, the energy aggregates in the two largest directions. In an embodiment, a two dimensional gesture may have a large change on multiple axes. This may cause the energy for a two dimensional gesture to be spread out and may result in a lower energy aggregation value. As a result, the energy aggregation value for a one dimensional gesture may be larger than an energy aggregation value for a two dimensional gesture.

For example, a gesture to the right may have a higher energy aggregation value as much of the energy is focused on the right side of an axis. Similarly, a gesture up may have a higher energy aggregation value as much of the energy is focused up, or near the top, of an axis. However, a gesture of a square may have energy aggregation values dispersed throughout an axis as a gesture of a square would have a user moving up, down left and right. As a result, the gesture of a square, a two dimensional gesture, may have a lower energy aggregation value than a gesture to the right, a one dimensional gesture.

An energy aggregation threshold value may be determined. If the energy aggregation is greater than an energy aggregation threshold, then the gesture may be a one dimensional gesture 320. If the energy aggregation is less than an energy aggregation threshold, then the gesture may be a two dimensional gesture 325. In an embodiment, the energy aggregation threshold may be 0.25. In an embodiment, the energy aggregation threshold may be 0.1 to 0.5.

As shown in Equation 6, the gesture may be a one dimensional gesture when the energy aggregation value, A, of the gesture, $\vec{D}_p$, is above an energy aggregation threshold, $th_1$, and the gesture may be a two dimensional gesture when the energy aggregation value, A, of the gesture, $\vec{D}_p$, is below an energy aggregation threshold, $th_1$:

$$\vec{D}_p \in \begin{cases} A(\vec{D}_p) > th_1 \\ A(\vec{D}_p) \le th_1 \end{cases} \quad \text{Equation 6}$$

If $A(\vec{D}_p) > th_1$, then $\vec{D}_p$ is a one dimensional gesture

If $A(\vec{D}_p) \le th_1$, then $\vec{D}_p$ is a two dimensional gesture

When the energy aggregation value is greater than the energy aggregation threshold 315, then the gesture may be a one dimensional gesture 320. When the energy aggregation is less than or equal to the energy aggregation threshold 315, then the gesture may be a two dimensional gesture 325.

If the gesture is a one dimensional gesture, it may be determined 320 whether the one dimensional gesture includes one direction or two directions. Referring again to FIG. 5, one direction gestures 515 may include, but are not limited to, right 525, left 530, up 535 and/or down, 540. Two direction gestures 520 may include, but are not limited to, up to down 545, down to up 550, right to left 555, and/or left to right 560.

Referring again to FIG. 3, in an embodiment, the zero crossing rate may be used to determine 320 whether the gesture is a one dimensional gesture or two dimensional gesture. The zero crossing rate may be the rate of sign-changes of data corresponding to a gesture. For example, the zero crossing rate may be the rate at which data corresponding to the gesture changes from positive to negative and/or negative to positive. In an embodiment, the rate may be the number of times the gesture changes from positive to negative and/or negative to positive.

Figure 7:
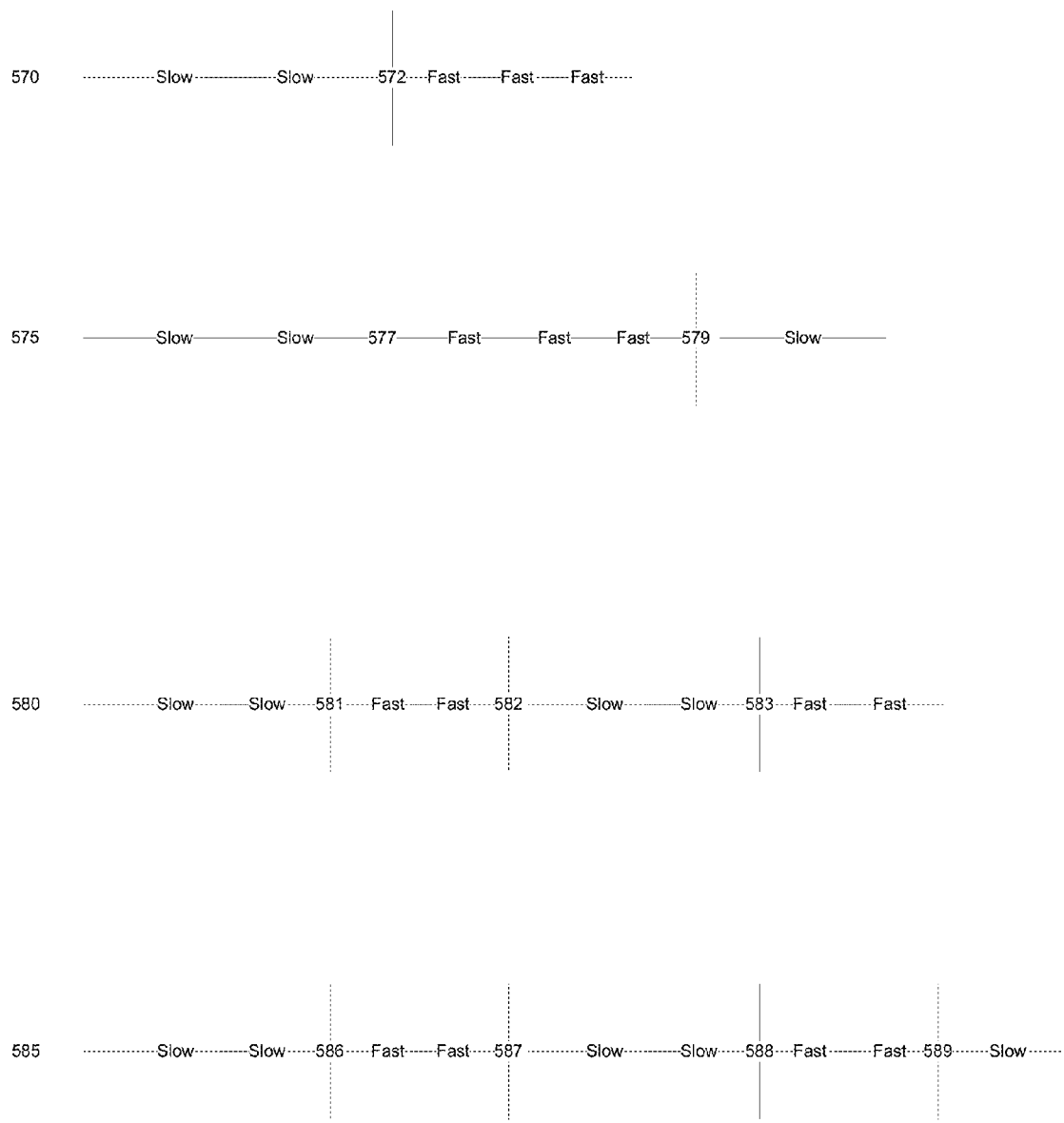
FIG. 7 illustrates an embodiment of zero crossing rates for one dimensional gestures.

FIG. 7 illustrates an embodiment of zero crossing rates for one dimensional gestures. For example, a gesture 570 may be a hand waving from right to left. The speed of the gesture 570 may be slow-slow-fast-fast-fast. The gesture 570 may have picked up speed during the movement from right to left. The zero-crossing rate of this gesture 570 may be one because data corresponding to the gesture 570 may have crossed the zero line when the gesture 570 moved from slow to fast 572.

For example, the gesture 575 may be a hand moving down. The speed of the gesture 575 may be slow-slow-fast-fast-fast-slow. The gesture 575 may have picked up speed during the gesture 575 from up to down and may have slowed down at the end of the movement. The zero-crossing rate of this gesture 575 may be two. The data corresponding to the gesture 575 may have crossed the zero line 577 for a first time when the gesture 575 moved from slow to fast. The data corresponding to the gesture 575 may have crossed the zero line 579 for a second time when the gesture 575 moved from fast to slow. The examples are not limited to the embodiments described.

In an embodiment, the gesture may be a two direction gesture. For example, a person may wave from right to left and left to right. The speed of the gesture 580 may be slow-slow-fast-fast-slow-slow-fast-fast. The gesture 580 may have picked up speed during the movement from right to left and then may have picked up speed during the movement from left to right. The data corresponding to the gesture 580 may have crossed the zero line 581 for a first time when the gesture moved from slow to fast. The data corresponding to the gesture 580 may have crossed the zero line 582 for a second time when the gesture moved from fast to slow. The data corresponding to the gesture 580 may have crossed the zero line 583 for a third time when the gesture 580 moved from slow to fast. The zero-crossing rate of the gesture 580 may be three.

For example, the gesture 585 may be a wave from left to right and right to left. The speed of the gesture 585 may be slow-slow-fast-fast-slow-slow-fast-fast-slow. The gesture 585 may have picked up speed during the gesture 585 from left to right, picked up speed during the gesture 585 from right to left and then slowed down at the end. The data corresponding to the gesture 585 may have crossed the zero line 586 for a first time when the gesture 585 moved from slow to fast. The data corresponding to the gesture 585 may have crossed the zero line 587 for a second time when the gesture moved from fast to slow. The data corresponding to the gesture 585 may have crossed the zero line 588 for a third time when the gesture moved from slow to fast. The data corresponding to the gesture 585 may have crossed the zero line 589 for a fourth time when the gesture 585 moved from fast to slow. The gesture 585 may have a zero crossing rate of four. The embodiments, however, are not limited to these examples.

As described in the examples, a one direction gesture may have a zero crossing rate, ZCR, that is less than a zero crossing rate for a two direction gesture. In an embodiment, the zero crossing rate, ZCR, of the gesture may be compared to a first zero crossing rate threshold, $th_{ZCR1}$, in order to determine whether the gesture is a one or two direction gesture. In an embodiment, the first zero crossing rate threshold, $th_{ZCR1}$, may be 2. In an embodiment, the threshold may be 1 to 3.

It may be determined 320 whether the zero crossing rate of the gesture is greater than the zero crossing rate threshold, $th_{ZCR1}$. As shown in Equation 7, when the zero crossing rate of the gesture, $\vec{D}_p$, is less than or equal to a zero crossing rate threshold, $th_{ZCR1}$, the gesture may be a one direction gesture and when the zero crossing rate, ZCR, of the gesture, $\vec{D}_p$, is greater than a zero crossing rate threshold, $th_{ZCR1}$, the gesture may be a two direction gesture.

$$\vec{D}_p \in \begin{cases} ZCR(\vec{D}_p) \le th_{ZCR1} \\ ZCR(\vec{D}_p) > th_{ZCR1} \end{cases} \quad \text{Equation 7}$$

If $ZCR(\vec{D}_p) \le th_{ZCR1}$, then $\vec{D}_p$ is a one direction gesture

If $ZCR(\vec{D}_p) > th_{ZCR1}$, then $\vec{D}_p$ is a two direction gesture

Referring again to FIG. 3, when the zero crossing rate is less than or equal to the zero crossing rate threshold 320, then the gesture may be a one direction gesture and the type of one direction gesture may be determined 330. The gesture control analyzer may determine 330 the type of one direction gesture by using physical properties and/or characteristics of the data. In an embodiment, a three dimensional axis may be associated with data corresponding to the gesture. Physical properties of the data corresponding to the gesture may be used to determine on which axis the acceleration occurred. In an embodiment, physical properties of the data and statistics may assist in determining the direction of the gesture. In an embodiment, the three dimensional axis may be flexible and may vary with various data from different users.

In an embodiment, the direction of the gesture may be determined using the vectors. The property of $\vec{v}_1$ may be used to decide which direction the gesture occurred. For example, using the axes, if $\vec{v}_1$ has bigger eigenvalues than $\vec{v}_2$, e.g., $a_1 > a_2$, then Equation 8 may be used to determine the one dimensional gesture direction:

$$d = \arg_{x_0, y_0, z_0} \min(|v_1 \cdot x_0|, |v_1 \cdot y_0|, |v_1 \cdot z_0|)$$

$$x_0 = [1,0,0]^T, y_0 = [0,1,0]^T, z_0 = [0,0,1]^T \quad \text{Equation 8}$$

In an embodiment, $x_0$ may be the direction to the right, $y_0$ may be the direction up. Thus d in Equation 8 may help classify the vector $\vec{v}_1, \vec{v}_2$ to be left/right and/or up/down. By combining the sign value of $v_1 \cdot x_0, v_1 \cdot y_0$, and $v_1 \cdot z_0$, one direction gestures may be determined as shown in Equation 9:

$$\vec{D}_p = \begin{cases} d = x_0 \ \& \ v_1 \cdot x_0 > 0 \\ d = x_0 \ \& \ v_1 \cdot x_0 < 0 \\ d = y_0 \ \& \ v_1 \cdot y_0 > 0 \\ d = y_0 \ \& \ v_1 \cdot y_0 < 0 \end{cases} \quad \text{Equation 9}$$

If $d = x_0$ & $v_1 \cdot x_0 > 0$ then the gesture $\vec{D}_p$ is to the left

If $d = x_0$ & $v_1 \cdot x_0 < 0$, then the gesture $\vec{D}_p$ is to the right If $d = y_0$ & $v_1 \cdot y_0 > 0$, then the gesture $\vec{D}_p$ is up If $d = y_0$ & $v_1 \cdot y_0 < 0$, then the gesture $\vec{D}_p$ is down Using Equation 9, a graph that shows data corresponding to the gesture increasing along the x-axis may indicate a movement to the left. For example, a graph that shows data corresponding to the gesture decreasing along the y-axis may indicate a movement down.

When the zero crossing rate is greater than the zero crossing rate threshold, then the gesture may be a two direction gesture and the type of two direction gesture may be determined 335. Like determining the type of one direction gesture, the gesture control analyzer may determine 335 the type of two direction gesture by using physical properties of the data. It may be determined 335 on which axis the accelerations occurred using physical properties of the data and associating a three dimensional graph with the data. In an embodiment, statistical data may be used to determine the directions of the data. In an embodiment, the two direction gesture may be classified using Equations 8 and 9 to determine the first and second half of the gesture.

For example, a graph that shows data corresponding to the gesture increasing and decreasing along the x-axis may indicate a movement from left to right and right to left. For example, a graph that shows data corresponding to the gesture decreasing and increasing along the y-axis may indicate a movement from up to down and down to up.

By using the physical properties of the data corresponding to the gesture, gesture recognition may be treated as a classical data problem. This technique of using the physical properties to determine the type of one dimensional gesture is advantageous as little power is used since no complex algorithms are necessary.

In an embodiment, a gesture may be misclassified as a one dimensional gesture when in fact the gesture is a two dimensional gesture. The gesture may be misclassified based on the energy aggregative value. However, a two dimensional gesture may have a high zero crossing rate. For example, the zero crossing rate of a square may be 8 as one or more lines of the square may experience a fast and a slow portion. Similarly, a circle may also have a high zero crossing rating.

In an embodiment, the zero crossing rate of the gesture may be compared to a second zero crossing rate threshold. The second zero crossing rate threshold may ensure that the gesture is properly categorized as a one dimensional gesture with two directions. If the zero crossing rate of the gesture is greater than the second zero crossing rate threshold, then the gesture may be a two dimensional gesture. In an embodiment, the second zero crossing rate threshold may be 5. In an embodiment, the second zero crossing rate threshold may be 4 to 6. In an embodiment, the second zero crossing rate threshold may be 5 or higher.

As a two dimensional gesture may be improperly categorized as a one dimensional gesture based on the energy aggregation threshold, A, determining whether the zero crossing rate is above a second zero crossing rate threshold, $th_{ZCR2}$, may increase the accuracy of the categorization of the gesture. In an embodiment, the second zero crossing rate threshold, $th_{ZCR1}$, may be higher than the first zero crossing rate threshold, $th_{ZCR1}$. For example, the first zero crossing rate threshold, $th_{ZCR1}$, may be 2 and the second zero crossing rate threshold, $th_{ZCR2}$, may be 5. The embodiments, however, are not limited to these examples.

When the zero crossing rate, ZCR, of the gesture, $\vec{D}_p$, is higher than a second zero crossing rate threshold, $th_{ZCR2}$, the gesture control analyzer may determine that the gesture is a two dimensional gesture. As shown in Equation 10, when the zero crossing rate, ZCR, of the gesture, $\vec{D}_p$, is higher than a second zero crossing rate threshold, $th_{ZCR2}$, the gesture control analyzer may re-categorize the gesture from a one dimensional, one direction gesture to a two dimensional gesture:

$$\vec{D}_p = \begin{cases} ZCR(\vec{D}_p) \leq th_{ZCR2} \\ ZCR(\vec{D}_p) > th_{ZCR2} \end{cases} \quad \text{Equation 10}$$

If $ZCR(\vec{D}_p) \leq th_{ZCR2}$ then $\vec{D}_p$ is a one dimensional gesture If $ZCR(\vec{D}_p) > th_{ZCR2}$ then $\vec{D}_p$ is a two dimensional gesture In an embodiment, the gesture may be a two dimensional gesture. If the gesture is a two dimensional gesture, then an energy dispersion value may be determined 325. The gesture control analyzer may determine an energy dispersion value in order to determine a motion plane of the gesture.

A motion plane may be calculated with the largest two eignevalues, e.g., $\vec{v}_1, \vec{v}_2$ from Equation 5C where the covariance matrix, $\vec{C}$, equaled the sum of the eigenvalues. In an embodiment, the motion plane may be the projection of motion vector, $\vec{D}_p$, onto new coordinate directions $\vec{v}_1$ and $\vec{v}_2$. In an embodiment, in order to determine the type of the two dimensional gesture 325, the gesture control analyzer may calculate $\vec{v}_1$ and $\vec{v}_2$ for each real time gesture.

In an embodiment, $s_1$ and $s_2$ may represent vectors in an energy dispersion graph. In an embodiment, $s_1$ and may represent the two main directions of the energy dispersion for two dimensional gestures. In an embodiment, the motion plane vector, $\vec{D}_m$, may be determined by transposing the vectors, $\vec{v}_1, \vec{v}_2$, and projecting the pre-processed data, $\vec{D}_p$, onto the vectors, $\vec{v}_1, \vec{v}_2$. In an embodiment, this process of transferring of axes may be as shown in Equation 11:

$$\vec{D}_m = [\vec{v}_1, \vec{v}_2]^T \times \vec{D}_p = [\vec{s}_1, \vec{s}_2]^T \quad \text{Equation 11}$$

Figure 8:
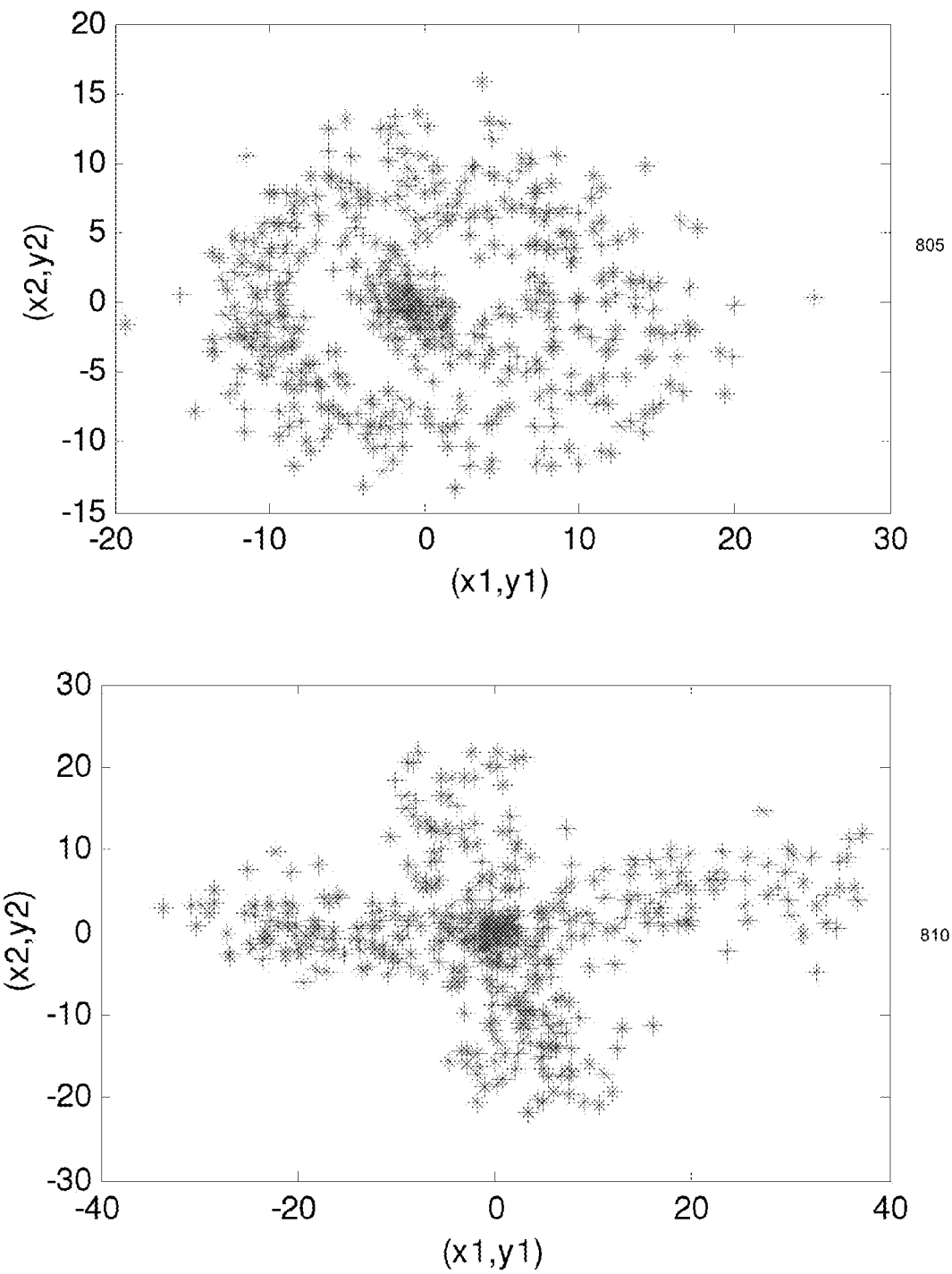
FIG. 8 illustrates embodiments of energy dispersion graphs.

FIG. 8 illustrates embodiments of energy dispersion graphs. In an embodiment, different gestures may result in different energy dispersions. For example, a first energy dispersion graph may be for a circle 805 and the second energy dispersion graph may be for a square 810. In an embodiment, the disperse shape graph may resemble the gesture path itself. In an embodiment, the distance of the points to the center may be calculated. In an embodiment, the gesture control interface may use the descriptor ($\vec{s}_1, \vec{s}_2$) to discriminate between the gestures. In an embodiment, the gesture control interface may determine the measurement of the energy dispersion by transforming the descriptor ($\vec{s}_1, \vec{s}_2$), as shown in Equation 12:

$$R = \frac{1}{N}\sum_{j=1}^{N}\left[\vec{s}_1(j) - \frac{1}{N}\sum_{i=1}^{N}\vec{s}_1(i)\right] \times \left[\vec{s}_2(j) - \frac{1}{N}\sum_{i=1}^{N}\vec{s}_2(i)\right] \quad \text{Equation 12}$$

In an embodiment, N may be the length of the vector ($\vec{s}_1, \vec{s}_2$). In an embodiment, the R measurement may represent the energy dispersion shape and may naturally discriminate between gesture such as, but not limited to, a circle and rectangle In Equation 12, $$\frac{1}{N}\sum_{i=1}^{N}\vec{s}_1(i)$$

may represent the mean value of vector $\vec{s}_1$, N may be the length of $\vec{s}_1$ and may represent the $i^{th}$ sample value, e.g. $\vec{s}_1 = \{\vec{s}_1(i)\}$. The i in $$\frac{1}{N}\sum_{i=1}^{N}\vec{s}_2(i)$$

may have a similar meaning for the $\vec{s}_2$ vector. In an embodiment, j may represent the $j^{th}$ sample in $\vec{s}_1$ and $\vec{s}_2$. In an embodiment, Equation 12 may be substituted for Equation 13:

$$R = \frac{1}{N}\sum_{j=1}^{N}[\vec{s}_1(j) - \text{mean}(\vec{s}_j)] \times [\vec{s}_2(j) - \text{mean}(\vec{s}_2)] \quad \text{Equation 13}$$

Using the R measurement, it may be determined whether the two dimensional gesture is a circle or a square. In an embodiment, an energy dispersion threshold may be determined. The energy dispersion threshold may be used to discriminate between a circle and rectangle gesture. In an embodiment, the energy dispersion threshold may be 0.9. In an embodiment, the energy dispersion threshold may be 0.7-1.

As shown in Equation 14, when the energy dispersion measurement, R, of the gesture, $\vec{D}_p$, is higher than an energy dispersion threshold, $th_{ED}$, then the gesture may be a circle. When the energy dispersion measurement, R, of the gesture, $\vec{D}_p$, is less than or equal to an energy dispersion threshold, $th_{ED}$, then the gesture may be a square.

$$\vec{D}_p \in \begin{cases} R(\vec{D}_p) > th_{ED} \\ R(\vec{D}_p) \leq th_{ED} \end{cases} \quad \text{Equation 14}$$

If $R(\vec{D}) > th_{ED}$, then $\vec{D}_p$ is a circle

If $R(\vec{D}) \leq th_{ED}$, then $\vec{D}_p$ is a square

Figure 9:
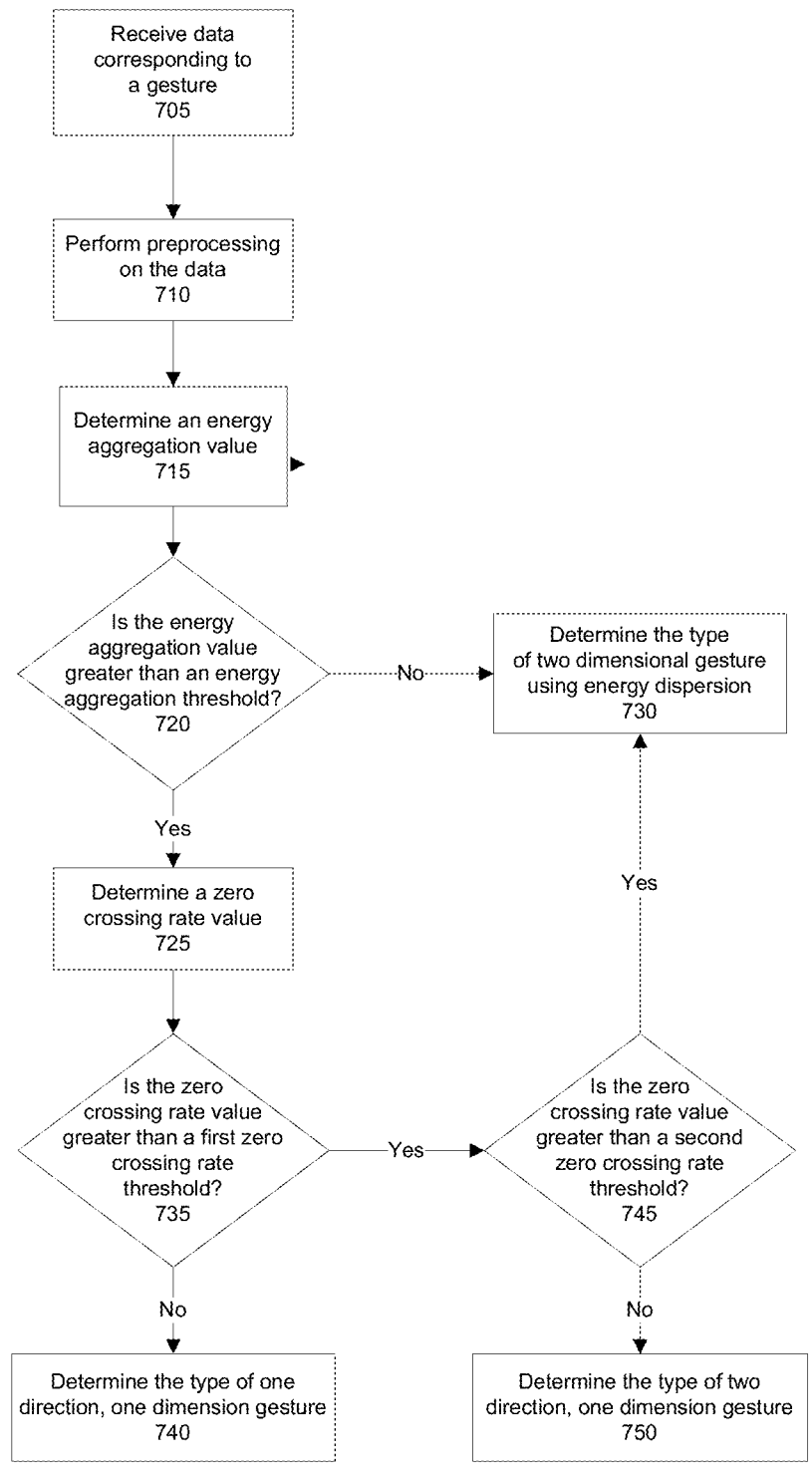
FIG. 9 illustrates a second embodiment of a logic flow.

FIG. 9 illustrates a second embodiment of a logic flow 700. In an embodiment, data may be received 705 corresponding to a gesture. A user may make a gesture. The data corresponding to the gesture may be collected and stored. In an embodiment, a gesture device may be separate from a receiving device. The data corresponding to a gesture may be received by a gesture device and sent to a receiving device. In an embodiment, the receiving device may receive 705 the data from the gesture device. In an embodiment, the receiving device and the gesture device may be a single device. In an embodiment, the receiving device may receive 705 the data corresponding to a gesture made by a user.

In an embodiment, pre-processing may be performed 710 on the data. Pre-processing may include, but is not limited to, filtering our noise from the data, normalizing the data and performing non-linear quantization.

In an embodiment, an energy aggregation value may be determined 715 using the pre-processed data. The energy aggregation value may determine 715 whether the gesture is a one dimensional gesture or a two dimensional gesture. The energy aggregation value may be determined 715 using principal component analysis. The energy aggregation value may determine 715 the gesture plane.

The energy aggregation value for a gesture may be compared 720 to an energy aggregation threshold. When the energy aggregation value is greater that than an energy aggregation threshold 720, then the gesture may be a one dimensional gesture 725. When the energy aggregation value is less than or equal to an energy aggregation threshold 720, then the gesture may be a two dimensional gesture 730.

In an embodiment, when the energy aggregation value is higher than the threshold, a zero crossing rate value may be determined 725. The zero crossing rate value may be used to determine whether the gesture is a one direction gesture or a two direction gesture.

When the zero crossing rate is not greater than a first zero crossing rate threshold 735, then the one dimensional gesture is a one direction gesture 740. The type of one direction one dimensional gesture may be determined 740. In an embodiment, the type of one direction gesture may be determined 740 using physical properties of data corresponding to the gesture.

In an embodiment, if the zero crossing rate is greater than a first zero crossing rate threshold 735, then the zero crossing rate may be compared to a second zero crossing rate threshold 745. In an embodiment, the second zero crossing rate threshold may be higher than the first zero crossing rate threshold. In an embodiment, the second zero crossing rate threshold may ensure that the gesture is properly categorized as a one dimensional gesture. In an embodiment, the second zero crossing rate threshold may be used to avoid misclassifying a two dimensional gesture as a one dimensional gesture if the energy aggregation value of the gesture is not greater than the energy aggregation threshold.

In an embodiment, if the zero crossing rate is not greater than a second zero crossing rate threshold 745, then the gesture may be a two direction, one dimensional gesture 750. The type of two direction, one dimensional gesture may be determined 750. In an embodiment, the type of two direction gesture may be determined 750 using physical properties of data corresponding to the gesture.

In an embodiment, if the zero crossing rate is greater than a second zero crossing rate threshold 745 and/or if the energy aggregation value is less than or equal to an energy aggregation threshold 720, then the gesture may be a two dimensional gesture 730. If the gesture is a two dimensional gesture, the type of two dimensional gesture may be determined 730. In an embodiment, the type of two dimensional gesture may be determined 730 using energy dispersion. By determining how the energy disperses and the distance from the center of a graph to the energy dispersion data, the type of two dimensional gesture may be determined 730.

The techniques described above create a high accuracy, low cost, user independent way to determine a gesture. Regardless of a user's technique of gesturing, the gesture may be determined with about 92% accuracy. In an embodiment, the one dimensional gesture rate of accuracy is about 96% and the two dimensional gesture rate of accuracy is about 90%. Being user independent saves time and removes boundaries for first time users. This technique is cost efficient due to the use of a decision tree and physical properties of the data to determine the type of gesture.

Figure 10:
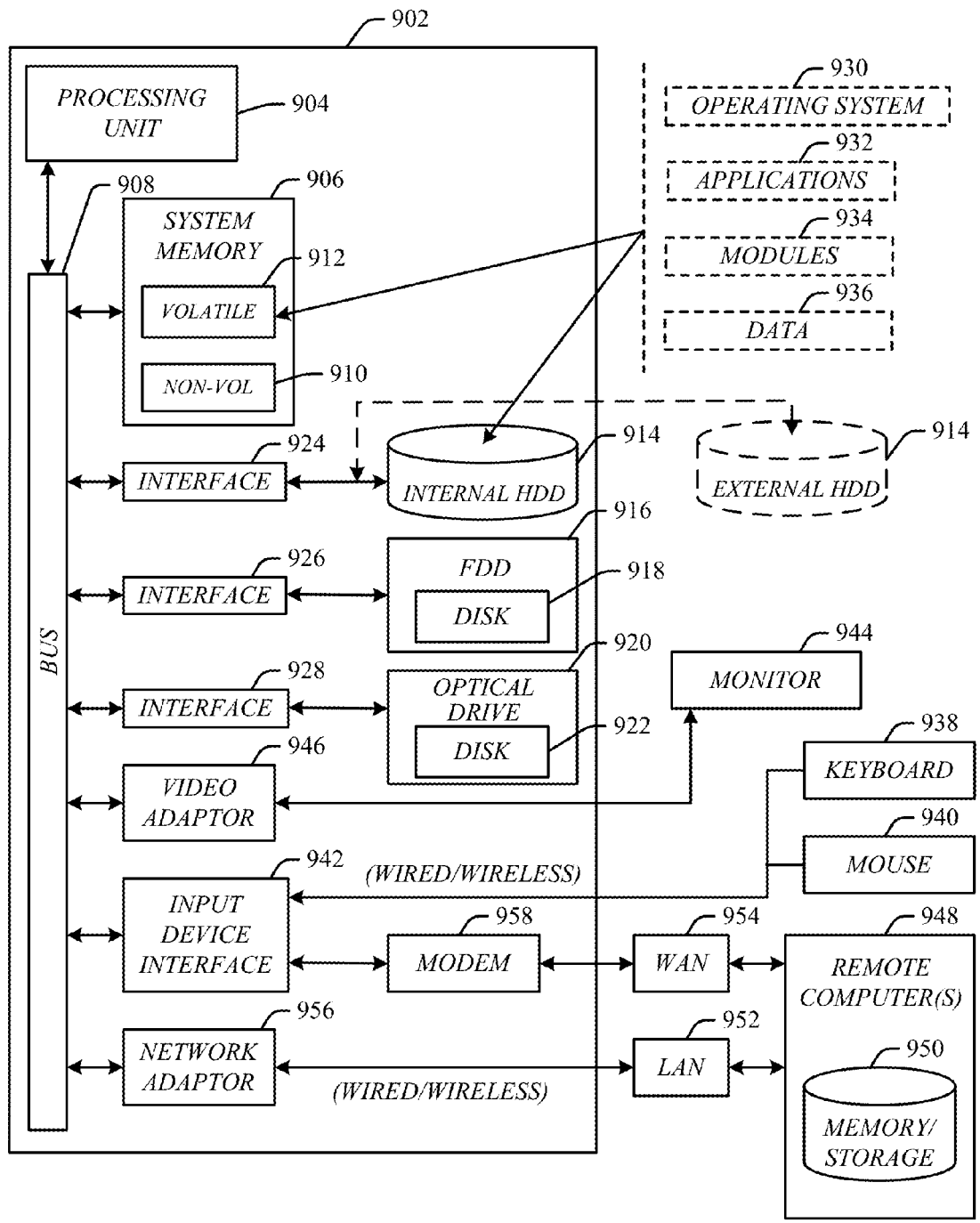
FIG. 10 illustrates an embodiment of an exemplary computing architecture.

FIG. 10 illustrates an embodiment of an exemplary computing architecture 900 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 900 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 900 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors. Dual microprocessors and other multi-processor architectures may also be employed as the processing unit 904. The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. The one or more application programs 932, other program modules 934, and program data 936 can include, for example, the decoder.

A user can enter commands and information into the computer 902 through one or more wire/wireless input devices, for example, a keyboard 938 and a pointing device, such as a mouse 940. Other input devices may include a microphone, an infra-red (IR) remote control, a joystick, a game pad, a stylus pen, touch screen, or the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network device, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An article comprising a non-transitory machine-readable storage medium containing instructions that when executed enable a system to:
   receive, from a gesture device, data corresponding to a gesture;
   determine a covariance matrix for the gesture based on the data;
   determine an energy aggregation value for the gesture based on the covariance matrix, using principal component analysis; and
   determine whether the gesture is a one or two dimensional gesture based at least in part on the energy aggregation value.

2. The article of claim 1, the non-transitory machine-readable storage medium containing instructions that when executed enable a system to:
   determine the gesture using a multi-level decision tree.

3. The article of claim 1, the non-transitory machine-readable storage medium containing instructions that when executed enable a system to:
   determine a zero crossing rate when the gesture is a one dimensional gesture.

4. The article of claim 1, the non-transitory machine-readable storage medium containing instructions that when executed enable a system to:
   determine that the gesture is a two direction, one dimensional gesture when a zero crossing rate of the gesture is higher than a first threshold.

5. The article of claim 4, the non-transitory machine-readable storage medium containing instructions that when executed enable a system to:
   determine that the gesture is a two dimensional gesture when the zero crossing rate of the gesture is higher than a second threshold.

6. The article of claim 1, the non-transitory machine-readable storage medium containing instructions that when executed enable a system to:
   determine that the gesture is a one direction, one dimensional gesture when a zero crossing rate of the gesture is lower than a first threshold.

7. The article of claim 1, the non-transitory machine-readable storage medium containing instructions that when executed enable a system to:
   normalize the data.

8. The article of claim 1, the non-transitory machine-readable storage medium containing instructions that when executed enable a system to:
   remove noise from the data.

9. The article of claim 1, the non-transitory machine-readable storage medium containing instructions that when executed enable a system to:
   measure energy dispersion to determine a type of two dimensional gesture.

10. The article of claim 1, the non-transitory machine-readable storage medium containing instructions that when executed enable a system to:
    determine whether the gesture is one or more of: up, down, left and right.

11. The article of claim 1, the non-transitory machine-readable storage medium containing instructions that when executed enable a system to:
    determine whether the gesture is one or more of: up and down, down and up, left and right, and right and left.

12. The article of claim 1, the non-transitory machine-readable storage medium containing instructions that when executed enable a system to:
    determine whether the gesture is one or more of a square and a circle.

13. A gesture recognition system comprising:
    a device with:
      a logic component; and
      a gesture control analyzer operative on the logic component to:
        receive, from a gesture device, data corresponding to a gesture;
        determine a covariance matrix for the gesture based on the data;
        determine an energy aggregation value for the gesture based on the covariance matrix, using principal component analysis; and
        determine whether the gesture is a one or two dimensional gesture based at least in part on the energy aggregation value.

14. The system of claim 13, the gesture control analyzer operative on the logic component to determine the gesture using a multi-level decision tree.

15. The system of claim 13, the gesture control analyzer operative on the logic component to determine a zero crossing rate when the gesture is a one dimensional gesture.

16. The system of claim 13, the gesture control analyzer operative on the logic component to determine that the gesture is a two direction, one dimensional gesture when a zero crossing rate of the gesture is higher than a first threshold.

17. The system of claim 16, the gesture control analyzer operative on the logic component to determine that the gesture is a two dimensional gesture when the zero crossing rate of the gesture is higher than a second threshold.

18. The system of claim 13, the gesture control analyzer operative on the logic component to determine that the gesture is a one direction, one dimensional gesture when a zero crossing rate of the gesture is lower than a first threshold.

19. The system of claim 13, the gesture recognition system comprising:
    a wireless antenna.

20. A method, comprising:
    receiving, from a gesture device, data corresponding to a gesture;
    determining, by a processor, a covariance matrix for the gesture based on the data;
    determining, by the processor, an energy aggregation value for the gesture based on the covariance matrix, using principal component analysis; and
    determining whether the gesture is a one or two dimensional gesture based at least in part on the energy aggregation value.

21. The method of claim 20, comprising:
    determining the gesture using a multi-level decision tree.

22. The method of claim 20, comprising:
    determining a zero crossing rate when the gesture is a one dimensional gesture.

23. The method of claim 20, comprising:
    determining that the gesture is a two direction, one dimensional gesture when a zero crossing rate of the gesture is higher than a first threshold.

24. The method of claim 23, comprising:
    determining that the gesture is a two dimensional gesture when the zero crossing rate of the gesture is higher than a second threshold.

25. The method of claim 20, comprising:
determining that the gesture is a one direction, one dimensional gesture when a zero crossing rate of the gesture is lower than a first threshold.

26. The method of claim 20, comprising:
measuring energy dispersion to determine a type of two dimensional gesture.

27. The method of claim 20, the one dimensional gesture comprises a one direction gesture or a two direction gesture.

28. The method of claim 20, comprising:
determining whether the gesture is one or more of: up, down, left and right.

29. The method of claim 20, comprising:
determining whether the gesture is one or more of: up and down, down and up, left and right, and right and left.

30. The method of claim 20, comprising:
determining whether the gesture is one or more of a square and a circle.

\* \* \* \* \*